United States Patent
Ito (10) Patent No.: US 7,084,419 B2
(45) Date of Patent: Aug. 1, 2006

(54) IMAGE INPUTTING APPARATUS AND IMAGE INPUTTING METHOD

(75) Inventor: Tsuyoshi Ito, Higashiyamato (JP)

(73) Assignee: Konica Corporation (JP)

( * ) Notice: Subject to any disclaimer, the term of this patent is extended or adjusted under 35 U.S.C. 154(b) by 359 days.

(21) Appl. No.: 10/638,886

(22) Filed: Aug. 11, 2003

(65) Prior Publication Data

US 2004/0031938 A1     Feb. 19, 2004

(30) Foreign Application Priority Data

Aug. 15, 2002     (JP)     ............................. 2002-236750

(51) Int. Cl.
*G06K 9/40* (2006.01)

(52) U.S. Cl. ..................................... 250/587; 382/254

(58) Field of Classification Search ................ 382/254; 250/587
See application file for complete search history.

(56) References Cited

U.S. PATENT DOCUMENTS

| | | | |
|---|---|---|---|
| 4,035,651 A * | 7/1977 | LeMay | ........................... 378/9 |
| 4,866,615 A * | 9/1989 | Ichihara | ................. 250/363.07 |
| 4,881,124 A | 11/1989 | Yokouchi et al. | |
| 5,633,510 A | 5/1997 | Rogers | |
| 6,172,772 B1 * | 1/2001 | Steinle et al. | ............... 358/406 |

FOREIGN PATENT DOCUMENTS

| | | |
|---|---|---|
| EP | 0 639 818 | 2/1995 |
| EP | 0 809 146 | 11/1997 |
| EP | 1391779 A2 * | 2/2004 |
| GB | 2 314 227 | 12/1997 |
| JP | 2002-156713 | 5/2002 |

OTHER PUBLICATIONS

European Search Report for Application No. 03017637.4-2217-dated Jan. 27, 2004.

* cited by examiner

*Primary Examiner*—Otilia Gabor
*Assistant Examiner*—Christine Sung
(74) *Attorney, Agent, or Firm*—Cantor Colburn LLP (57) ABSTRACT

There is described an image inputting apparatus for inputting a radiation image that is formed on a radiation sensitive panel by projecting radial rays penetrated through a subject. The apparatus includes a detector to detect the radiation image projected onto the radiation sensitive panel and a sensitivity compensating section to automatically find a sensitivity compensation value, which is employed for compensating for a sensitivity of the detector so that a signal value of the radiation image detected by the detector is substantially equal to a predetermined ideal value when a predetermined dose of the radial rays is irradiated onto the radiation sensitive panel. The apparatus also includes a storage section to store the predetermined ideal value of the signal value. The sensitivity compensating section finds an optimum sensitivity-offset value, which makes the signal value of the radiation image equal to the predetermined ideal value stored in the storage section.

19 Claims, 7 Drawing Sheets

IMAGE INPUTTING APPARATUS AND IMAGE INPUTTING METHOD

BACKGROUND OF THE INVENTION

The present invention relates to an image inputting apparatus for inputting radiation image information used mainly in a medical field and to an image inputting method.

There is known an image inputting apparatus that projects radial rays on a subject from a radiation generating apparatus and reads a radiation image formed by radiations penetrated through a subject to input image information. The image inputting apparatus of this kind includes a system (CR type) wherein a stimulable phosphor plate storing therein radiation image information is scanned by a laser beam, then, accelerated phosphorescence light thus generated is converged and then is converted photoelectrically by a photomultiplier (hereinafter referred sometimes to as "PMT") into electric signals, and a system (FPD type) that has a function to convert X-ray energy penetrated through a subject to be projected into electric signals to be structured again as an X-ray transmission image and is composed of a plate-shaped radiation image flat panel detector (X-ray flat panel detector) having a plane with an area that covers fully a portion of a human body necessary for image diagnostics.

For example, when conducting sensitivity compensation in an image inputting apparatus of a CR type, a calculation has been used for obtaining a sensitivity-offset value (value of setting voltage for PMT) for outputting ideal signal values from characteristic data concerning voltage and an amount of light of PMT and from signal values of PMT in the case of radiographing for sensitivity compensation.

In the convention CR type of this kind, when conducting sensitivity compensation, there have been needed voltage of PMT, characteristic data for an amount of light, ideal signal values and radiographing, resulting in inconvenience of obtaining and inputting of characteristic data, and further, a precision of sensitivity compensation has been low because of increased dominant causes for errors generated in numerical expressions and calculations.

SUMMARY OF THE INVENTION

To overcome the abovementioned drawbacks in conventional image inputting apparatus (hereinafter, also referred to as image-reading apparatus), it is an object of the present invention to provide image reading method and apparatus for detecting and reading radiation image information wherein sensitivity compensation can be conducted simply and accurately.

Accordingly, to overcome the cited shortcomings, the abovementioned object of the present invention can be attained by image-reading apparatus and image-reading methods described as follow.

(1) An apparatus for reading a radiation image that is formed on a radiation sensitive panel by projecting radial rays penetrated through a subject, the apparatus comprising: a detector to detect the radiation image projected onto the radiation sensitive panel; and a sensitivity compensating section to automatically find a sensitivity compensation value, which is employed for compensating for a sensitivity of the detector so that a signal value of the radiation image detected by the detector is substantially equal to a predetermined ideal value when a predetermined dose of the radial rays is irradiated onto the radiation sensitive panel.

(2) The apparatus of item 1, further comprising: a storage section to store the predetermined ideal value of the signal value; wherein the sensitivity compensating section finds an optimum sensitivity-offset value, which makes the signal value of the radiation image equal to the predetermined ideal value stored in the storage section, by varying the sensitivity of the detector, in order to establish the optimum sensitivity offset value as the sensitivity compensation value.

(3) The apparatus of item 2, wherein the detector includes a photomultiplier having a photo-electronic converting function and a power source to supply an electronic power to the photomultiplier by applying a drive voltage onto the photomultiplier; and wherein the detector varies the drive voltage so as to vary the sensitivity of the detector.

(4) The apparatus of item 3, wherein the detector varies the drive voltage in a direction of increasing the drive voltage.

(5) The apparatus of item 3, wherein a settling time, serving as a stabilizing time toward a target voltage, for decreasing the drive voltage is greater than that for increasing the drive voltage (6) The apparatus of item 1, further comprising: a storage section to store the predetermined ideal value of the signal value; wherein the radiation sensitive panel is an electro-radiation sensitive device, and the detector includes an amplifier to amplify radiation signals outputted from the electro-radiation sensitive device; and wherein the sensitivity compensating section finds an optimum sensitivity-offset value, which makes the signal value of the radiation image equal to the predetermined ideal value stored in the storage section, by varying an amplitude of the amplifier, in order to establish the optimum sensitivity offset value as the sensitivity compensation value.

(7) The apparatus of item 6, wherein the apparatus employs a Flat Panel Detector including the electro-radiation sensitive device and the detector.

(8) The apparatus of item 1, further comprising: a storage section to store the predetermined ideal value of the signal value; wherein the sensitivity compensating section finds an optimum sensitivity-offset value, which makes the signal value of the radiation image equal to the predetermined ideal value stored in the storage section, by employing an approximate equation derived from a plurality of sensitivity-offset values obtained by varying the sensitivity of the detector and signal values corresponding to the plurality of sensitivity-offset values, in order to establish the optimum sensitivity offset value as the sensitivity compensation value.

(9) The apparatus of item 1, further comprising: a storage section to store the predetermined ideal value of the signal value; wherein the sensitivity compensating section retrieves an optimum sensitivity-offset value, which makes the signal value of the radiation image equal to the predetermined ideal value stored in the storage section, from a plurality of sensitivity-offset values obtained by varying the sensitivity of the detector, in order to establish the optimum sensitivity offset value as the sensitivity compensation value.

(10) A method for reading a radiation image that is formed on a radiation sensitive panel by projecting radial rays penetrated through a subject, the method comprising the steps of: detecting the radiation image projected onto the radiation sensitive panel; and automatically finding a sensitivity compensation value, which is employed for compensating for a sensitivity of detecting the radiation image so that a signal value of the radiation image detected in the detecting step is substantially equal to a predetermined ideal value when a predetermined dose of the radial rays is irradiated onto the radiation sensitive panel.

(11) The method of item 10, further comprising the step of: establishing the predetermined ideal value in advance; wherein an optimum sensitivity-offset value, which makes the signal value of the radiation image equal to the predetermined ideal value established in the establishing step, is found by varying the sensitivity of detecting the radiation image, in order to establish the optimum sensitivity offset value as the sensitivity compensation value.

(12) The method of item 11, wherein a photomultiplier, having a photo-electronic converting function, and a power source, to supply an electronic power to the photomultiplier by applying a drive voltage onto the photomultiplier, are employed in the detecting step; and wherein the drive voltage is varied so as to vary the sensitivity of detecting the radiation image.

(13) The method of item 12, wherein a direction of varying the drive voltage is determined on the basis of an input-output response property of the power source.

(14) The method of item 12, wherein a settling time, serving as a stabilizing time toward a target voltage, of the drive voltage is determined on the basis of an input-output response property of the power source.

(15) The method of item 10, further comprising the step of: establishing the predetermined ideal value in advance; wherein the radiation sensitive panel is an electro-radiation sensitive device, and an amplifier to amplify radiation signals outputted from the electro-radiation sensitive device is employed in the detecting step; and wherein an optimum sensitivity-offset value, which makes the signal value of the radiation image equal to the predetermined ideal value established in the establishing step, is found by varying an amplitude of the amplifier, in order to establish the optimum sensitivity offset value as the sensitivity compensation value.

(16) The method of item 15, wherein a Flat Panel Detector, including the electro-radiation sensitive device and the amplifier, is employed in the detecting step.

(17) The method of item 10, further comprising the step of: establishing the predetermined ideal value in advance; wherein an optimum sensitivity-offset value, which makes the signal value of the radiation image equal to the predetermined ideal value established in the establishing step, is found by employing an approximate equation derived from a plurality of sensitivity-offset values obtained by varying the sensitivity of detecting the radiation image and signal values corresponding to the plurality of sensitivity-offset values, in order to establish the optimum sensitivity offset value as the sensitivity compensation value.

(18) The method of item 10, further comprising the step of: establishing the predetermined ideal value in advance; wherein an optimum sensitivity-offset value, which makes the signal value of the radiation image equal to the predetermined ideal value established in the establishing step, is retrieved from a plurality of sensitivity-offset values obtained by varying the sensitivity of detecting the radiation image, in order to establish the optimum sensitivity offset value as the sensitivity compensation value.

(19) The method of item 18, wherein a photomultiplier, having a photo-electronic converting function, and a power source, to supply an electronic power to the photomultiplier by applying a drive voltage onto the photomultiplier, are employed in the detecting step; and wherein the drive voltage is varied so as to vary the sensitivity of detecting the radiation image.

(20) The method of item 19, wherein, considering a response property of the power source when varying the drive voltage, the optimum sensitivity-offset value is retrieved from the plurality of sensitivity-offset values in order of low-to-high voltage values.

(21) The method of item 11, wherein at least one of the predetermined dose of the radial rays and the predetermined ideal value is changed with a predetermined magnification, and then, the optimum sensitivity-offset value is found as the sensitivity compensation value.

(22) The apparatus of item 2, wherein the detector includes a photomultiplier for detecting phosphor light emitted from the radiation sensitive panel and a power source to supply an electronic power to the photomultiplier by applying a drive voltage onto the photomultiplier, and the sensitivity of the detector varies with change of the drive voltage, and the optimum sensitivity-offset value corresponds to an optimum drive voltage; and wherein at least one of the predetermined dose of the radial rays and the predetermined ideal value is changed with a predetermined magnification, and then, the sensitivity compensating section finds the optimum drive voltage by varying the drive voltage, in order to establish the optimum drive voltage as a sensitivity compensation voltage.

(23) The apparatus of item 2, wherein the detector includes a photomultiplier, for detecting phosphor light emitted from the radiation sensitive panel when irradiating a light scanned at a predetermined sampling pitch in a sub-scanning direction onto the radiation sensitive panel recorded with the image, and a power source to supply an electronic power to the photomultiplier by applying a drive voltage onto the photomultiplier, and the sensitivity of the detector varies with change of the drive voltage, and the optimum sensitivity-offset value corresponds to an optimum drive voltage; and wherein the sensitivity compensating section finds the optimum drive voltage as a sensitivity compensation voltage by correcting differences between luminance signal values due to a difference of the predetermined sampling pitch.

Further, to overcome the abovementioned problems, other image inputting apparatus and image inputting methods, embodied in the present invention, will be described as follow:

(24) An image inputting apparatus, characterized in that, in the image inputting apparatus that is provided with a detector for detecting a radiation image and inputting image information based on the detected radiation image,
there is provided a sensitivity compensation means that automatically obtains a voltage established value of a detector in a way that a signal value of a radiation image detected by the detector, when a predetermined dose is given, may become a predetermined value.

In this image inputting apparatus, only one exposure of radiation is sufficient for sensitivity compensation, and characteristic data of the detector are not needed and inputting of them is not needed, thus, sensitivity compensation can be conducted simply, because a sensitivity compensation value is obtained automatically in a way that a signal value in the case of giving a predetermined dose may become a predetermined value. In addition, accuracy of sensitivity compensation is improved, because a calculation based on characteristic data is not required.

In the image inputting apparatus, it is possible to structure so that a storage means that stores an ideal value of the signal value in the case of giving a predetermined dose is further provided, and the sensitivity-offset value which makes the signal value in the case where the sensitivity compensation means makes the sensitivity compensation value to fluctuate as a sensitivity-offset value to be the same as the ideal value is obtained to be the sensitivity compensation value.

For example, when the detector is provided with a photomultiplier having a photoelectric converting function and with a power source that supplies an electronic power (voltage) to the photomultiplier, it is possible to make an electronic power (voltage) of the power source to fluctuate as a sensitivity-offset value, and to make the sensitivity-offset value wherein the signal value becomes the same as the ideal value to be a compensation voltage value.

It is preferable that the compensation voltage value is obtained in the direction for increasing voltage of the power source, and it is preferable that a stabilizing time for decreasing voltage of the power source is greater than that for increasing the voltage, which is consideration of a response in voltage fluctuation of the power source.

When the detector is provided with a flat panel detector and amplifier for detected signals on the flat panel detector, it is possible to make an amplitude of the amplifier to fluctuate as a sensitivity-offset value, and to make the sensitivity-offset value wherein the signal value becomes the same as the ideal value to be the sensitivity compensation value.

(25) An image inputting apparatus, characterized in that,
  in the image inputting apparatus that is provided with a detector for detecting a radiation image and inputting image information based on the detected radiation image,
  there are provided a storage means that stores an ideal value of the signal value in the case of giving a predetermined dose, and a sensitivity compensation means that obtains a sensitivity-offset value corresponding to the ideal value from an approximate expression of the sensitivity-offset value prepared based on plural sensitivity-offset values in the case of fluctuation of sensitivity compensation values of the detector and on the signal value obtained corresponding to each sensitivity-offset value and of the signal value, to make it to be the sensitivity compensation value of the detector.

In this image inputting apparatus, a sensitivity compensation value can be obtained from an approximate expression of plural sensitivity-offset values and of signal values and from the ideal value, and therefore, characteristic data of the detector are not needed and inputting of them is not needed, thus, sensitivity compensation can be conducted simply. In addition, accuracy of sensitivity compensation is improved, because a calculation based on characteristic data is not required.

Further, still another image inputting apparatus of the invention is one that is provided with a detector that detects a radiation image and inputs image information based on the aforesaid detected radiation image wherein there are provided a storage means that stores an ideal value of the signal value in the case of giving a predetermined dose, and a sensitivity compensation means that retrieves a signal value corresponding to the ideal value from the aforementioned plural signal values obtained in response to plural sensitivity-offset values in the case of fluctuation of sensitivity compensation values of the detector, and judges automatically the sensitivity-offset value at the time of the signal value to be the sensitivity compensation value.

In this image inputting apparatus, a signal value corresponding to the ideal value is retrieved from plural signal values, and the sensitivity-offset value at the time of the signal value is judged automatically to be the sensitivity compensation value, and therefore, characteristic data of the detector are not needed and inputting of them is not needed, thus, sensitivity compensation can be conducted simply. In addition, accuracy of sensitivity compensation is improved, because a calculation based on characteristic data is not required.

In the image inputting apparatus, when the detector is provided with a photomultiplier having a photoelectric converting function and with a power source that supplies an electronic power to the photomultiplier, the sensitivity-offset value is a voltage value of the power source, and the sensitivity compensation value is a compensation voltage value of the power source.

Further, when the detector is provided with a flat panel detector and an amplifier for detection signals of the flat panel detector, the sensitivity-offset value is an amplitude of the amplifier, and the sensitivity compensation value is a compensation amplitude of the amplifier.

(26) An image inputting method, characterized in that,
  in the image inputting method for detecting radiation images by means of a detector so as to input image information based on the detected radiation image,
  there are provided a step to detect, with the detector, a radiation image when a predetermined dose of radiation is irradiated for sensitivity compensation of the detector, and a step to obtain a sensitivity compensation value automatically for the detector in a way to make a signal value of the detected radiation image to be a predetermined value.

In this image inputting method, a sensitivity compensation value is obtained automatically in a way to make a signal value in the case of giving a predetermined dose to be a predetermined value, and therefore, only one exposure of radiation is sufficient for sensitivity compensation, and characteristic data of the detector are not needed and inputting of them is not needed, thus, sensitivity compensation can be conducted simply. In addition, accuracy of sensitivity compensation is improved, because a calculation based on characteristic data is not required.

In the image inputting method stated above, an ideal value of the signal value in the case of giving a predetermined dose can be obtained, and in the sensitivity compensation step, it is possible to obtain the sensitivity-offset value wherein the aforementioned signal value in the case of fluctuating the sensitivity compensation value as the sensitivity-offset value becomes equal to the ideal value to make it to be the sensitivity compensation value. By making the sensitivity-offset value wherein the signal value obtained by fluctuating the sensitivity-offset value up and down agrees with the ideal value after being compared therewith to be the sensitivity compensation value, as stated above, it is possible to obtain the sensitivity compensation value automatically.

For example, it is possible to make the sensitivity-offset value becoming equal to the ideal value to be the compensation voltage value, by fluctuating voltage of the power source as the sensitivity-offset value, by the use of a photomultiplier that receives voltage from the power source as the detector.

In this case, it is preferable that the direction for fluctuating the voltage in the case of obtaining the compensation voltage value is determined based on responsiveness in voltage fluctuation of the power source. For example, in the high-voltage power source for the photomultiplier, rise time in voltage increase is shorter in general, and that in voltage decrease is longer because of electric discharge of capacitor component, and therefore, it is possible to conduct sensitivity compensation more quickly, by obtaining the compensation voltage value in the aforesaid direction to increase the voltage.

Further, it is preferable that the stabilizing time in fluctuation of the voltage is determined based on responsiveness in the fluctuation of voltage of the power source. For example, the power source for the photomultiplier takes more time for stabilizing in general in the case of voltage reduction, and thereby, the sensitivity compensation can be conducted at stabilized voltage, by making the stabilizing time in the case of reducing the voltage to be longer than that in the case of increasing the voltage. Incidentally, it is preferable that the stand-by time is established to be suited to characteristics of the high-voltage power source.

By using a flat panel detector as the detector and by using an amplifier for signals detected by the flat panel detector, it is possible to fluctuate the amplification factor of the amplifier as the sensitivity-offset value and thereby to make the sensitivity-offset value wherein the signal value becomes equal to the ideal value to be the sensitivity compensation value.

(27) An image inputting method, characterized in that,
in the image inputting method for detecting radiation images by obtaining signal values with the detector so as to input image information based on the detected radiation image,
there are provided a step to obtain an ideal value of the signal value in the case of giving a predetermined dose, a step to prepare an approximate expression of the sensitivity-offset value and the signal value based on plural sensitivity-offset values in the case of fluctuating the sensitivity compensation value of the detector and on the signal value obtained corresponding to each sensitivity-offset value, and a step to obtain, from the approximate expression, the sensitivity-offset value corresponding to the ideal value to make it to be the sensitivity compensation value of the detector.

In this image inputting method, the sensitivity compensation value can be obtained from a plurality of sensitivity-offset values, signal values, an approximate expression and an ideal value, and therefore, characteristic data of the detector are not needed and inputting of them is not needed, thus, sensitivity compensation can be conducted simply. In addition, accuracy of sensitivity compensation is improved, because a calculation based on characteristic data is not required. Incidentally, the ideal value can be obtained by, for example, the following expression;

Signal value (step)=α log(X)+β log(kando)

wherein, X represents a dose of radiation, kando represents a value relating to sensitivity (for example, QR value described later), and α and β represent a constant.

(28) An image inputting method, characterized in that,
in the image inputting method for detecting radiation images by obtaining signal values with the detector so as to input image information based on the detected radiation image,
there are provided a step to obtain an ideal value of the signal value in the case of giving a predetermined dose, a step to obtain a plurality of signal values obtained by corresponding to plural sensitivity-offset values in the case of fluctuating sensitivity compensation values of the detector, and a step to retrieve a signal value corresponding to the ideal value from the plural signal values and to distinguish the sensitivity-offset value in the then signal value automatically to be the sensitivity compensation value.

In this image inputting method, the signal value corresponding to the ideal value is retrieved from plural signal values, and the sensitivity-offset value in the case of the then signal value is automatically distinguished to be the sensitivity compensation value, and therefore, characteristic data of the detector are not needed and inputting of them is not needed, thus, sensitivity compensation can be conducted simply. In addition, accuracy of sensitivity compensation is improved, because a calculation based on characteristic data is not required.

In the image inputting method, when there is used a photomultiplier that receives voltage from the power source ad the detector, the sensitivity-offset value is a voltage value of the power source, and the sensitivity compensation value is a compensation voltage value of the power source.

Further, when there are used a flat panel detector as the detector and an amplifier for the signals detected by the flat panel detector, the sensitivity-offset value is the amplification factor of the amplifier, and the sensitivity compensation value is a compensation amplification factor of the amplifier.

Incidentally, in the image inputting apparatus and the image inputting method mentioned above, the occasion where the signal value and an ideal value become equal to each other is judged to include not only an occasion where both of them agree with each other but also an occasion where both of them are different each other but each of them is in a prescribed range.

In the step of the still another image inputting method to obtain a plurality of the signal values obtained in response to the plural sensitivity-offset values, it is preferable that the signal value corresponding to the ideal value is retrieved from the plural signal values, and a sensitivity-offset value in the case of the signal value is judged automatically from sensitivity-offset values with lower voltage in consideration of responsiveness in voltage fluctuation, to be the sensitivity compensation value.

Further, in the aforesaid image inputting method, when sensitivity-offset value wherein the signal value in the case of fluctuating a sensitivity compensation value as the sensitivity-offset value becomes equal to the ideal value is obtained to be the sensitivity compensation value, it is possible to obtain the sensitivity compensation value by obtaining the sensitivity compensation value after changing at least one of the predetermined dose and the ideal value with a prescribed magnification, even when there is a sensitivity difference on the recording medium when detecting a radiation image from the recording medium, for example.

Namely, in the aforesaid image inputting method in which a sensitivity-offset value wherein the signal value in the case of fluctuating a sensitivity compensation value as the sensitivity-offset value becomes equal to the ideal value is obtained to be the sensitivity compensation value, it is possible to arrange so that the sensitivity-offset value is a voltage value of the power source, and a compensation voltage value is obtained as the sensitivity compensation value and the compensation voltage value is obtained after changing at least one of the predetermined dose and the ideal value with a prescribed magnification based on a sensitivity difference of the recording medium, by using, as the detector, a photomultiplier that receives voltage from the power source and detects light emitted from a recording medium on which the radiation image is recorded. By virtue of this arrangement, a sensitivity compensation value can be obtained even when a recording medium has a sensitivity difference.

Further, by using, as the detector, a photomultiplier that receives voltage from the power source and detects light emitted when a recording medium on which the radiation image is recorded is subjected to sub-scanning at a prescribed sampling pitch to be irradiated by irradiation light, it is possible to arrange so that the sensitivity-offset value is a voltage value of the power source, and a compensation voltage value is obtained as the sensitivity compensation value and the compensation voltage value is obtained after correcting a difference of brightness signal value caused by a difference of the sampling pitch. By virtue of this arrangement, even when an amount of light emitted from the recording medium is changed by a difference of the sampling pitch, the difference of an amount of emitted light can be corrected automatically.

BRIEF DESCRIPTION OF THE DRAWINGS

Other objects and advantages of the present invention will become apparent upon reading the following detailed description and upon reference to the drawings in which:

FIG. 3(a) and FIG. 3(b) are diagrams of input and output waveforms of the high-voltage power source shown in FIG. 1, and specifically, FIG. 3(a) shows an example of input voltage waveform of a control signal to be applied on the high-voltage power source while FIG. 3(b) shows an example of output voltage waveform from the high-voltage power source;

DETAILED DESCRIPTION OF THE PREFERRED EMBODIMENT

Figure 1:
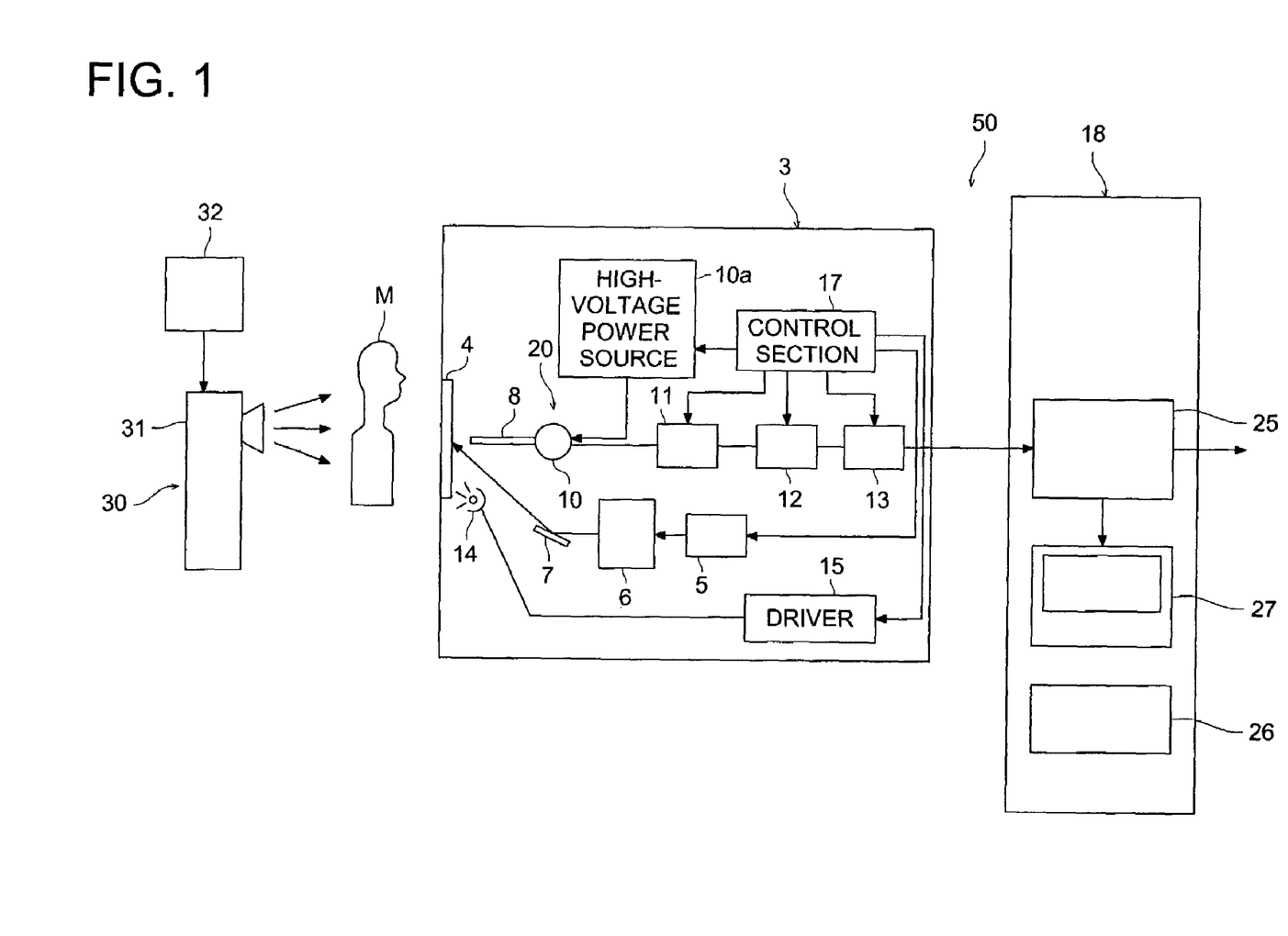
FIG. 1 is a schematic diagram of a radiation image inputting apparatus of the embodiment of the invention.

An embodiment of the invention will be explained as follows, referring to the drawings. FIG. 1 is a schematic diagram of a radiation image inputting apparatus of the embodiment of the invention. Radiation image inputting apparatus 50 in FIG. 1 is a radiation image inputting apparatus of a CR type that inputs information of a radiation image by reading a radiation image recorded on stimulable phosphor plate 4 representing a recording medium, and it is provided with inputting apparatus 3 and controller 18 as shown in FIG. 1.

Inputting apparatus 3 shown in FIG. 1 is one for obtaining image signals wherein sheet-shaped stimulable phosphor plate 4 that is formed by laminating accumulative phosphors on a support by using stimulable phosphor showing stimulated emission in accordance with radiation energy accumulated when excitation light such as visible light or a laser beam is projected after a part of radiation energy is accumulated when radiation is projected, on which radiation image information of subject M such as a human body formed by radial rays radiated from radiation generating apparatus 30 is accumulated momentarily to be recorded is scanned by a laser beam to conduct stimulated emission successively, and this stimulated emission light is read photoelectrically in succession by photoelectric reading section 20. In the inputting apparatus 3, an accumulative phosphor plate after image signals thereon have been read is irradiated by erasing light, and the phosphor plate discharges radiation energy remaining on the plate to be ready for the following radiographing. The radiation generating apparatus 30 is provided with radiation projecting portion 31 that projects radial rays on subject M from a tube and with control section 32 that controls the radiation projecting portion 31.

The inputting apparatus 3 is provided with stimulable phosphor plate 4 that records radiation image information of a subject, laser light source section 6 composed of laser diodes which generate laser beams representing excitation light for the stimulable phosphor plate 4, laser drive circuit 5 for driving the laser light source section 6, optical system 7 that makes a laser beam emitted from the laser light source section 6 to scan the stimulable phosphor plate 4 and with photoelectric reading section 20 that converges stimulated emission light excited from excitation laser beam and converts photoelectrically to obtain image signals.

The photoelectric reading section 20 is provided with light-converging object 8 that converges stimulated emission light excited by excitation laser beam, photomultiplier (PMT) 10 that converts light converged by the light-converging object 8 photoelectrically and functions as a detector, high-voltage power source 10a that impresses voltage on the photomultiplier 10, current-voltage converting portion 11 that conducts logarithm-voltage transform for current signals coming from the photomultiplier 10, A/D converting portion 12 that conducts A/D transform for analog signals coming from the current-voltage converting portion 11 and compensating portion 13 that conducts various compensating for the digital signals converted, and transmits digital signals of radiation image data thus read to the controller 18. The compensating portion 13 has a memory to store compensating data, and it can compensate density unevenness caused by an optical system and a light-converging system.

The inputting apparatus 3 further has therein halogen lamp 14 for projecting erasing light and driver 15 for driving the halogen lamp 14, for removing radiation energy remaining on a stimulable phosphor plate after the image signals have been read. Further, the inputting apparatus 3 has therein control section 17 that controls laser drive circuit 5, high-voltage power source 10a, current-voltage converting portion 11, A/D converting portion 12, compensating portion 13 and driver 15. Laser light source section 6, optical system 7, light-converging object 8, photomultiplier 10 and halogen lamp 14 of the inputting apparatus 3 are moved integrally as an unillustrated sub-scanning unit by a ball-screw mechanism in the sub-scanning direction that is perpendicular to the laser scanning direction. This sub-scanning unit conducts sub-scanning by moving while images are read, and when it travels for its returning stroke, halogen lamp 14 is lit and thereby, radiation image information remaining on the stimulable phosphor plate 4 is erased. In this way, the radiation image information recorded on the stimulable phosphor plate 4 is read automatically, then, information inputting is conducted and remaining images after reading are erased to be ready for the following radiographing.

The controller 18 has personal computer main body 25, key board 26 and monitor display section 27, and digital signals of radiation image data received from the inputting apparatus 3 are stored in the memory temporarily, then, image processing is conducted, display on monitor display portion 27 and image processing are controlled in accordance with operation input from key board 26, and radiation image data which have been subjected to image processing are outputted to the outside.

Figure 2:
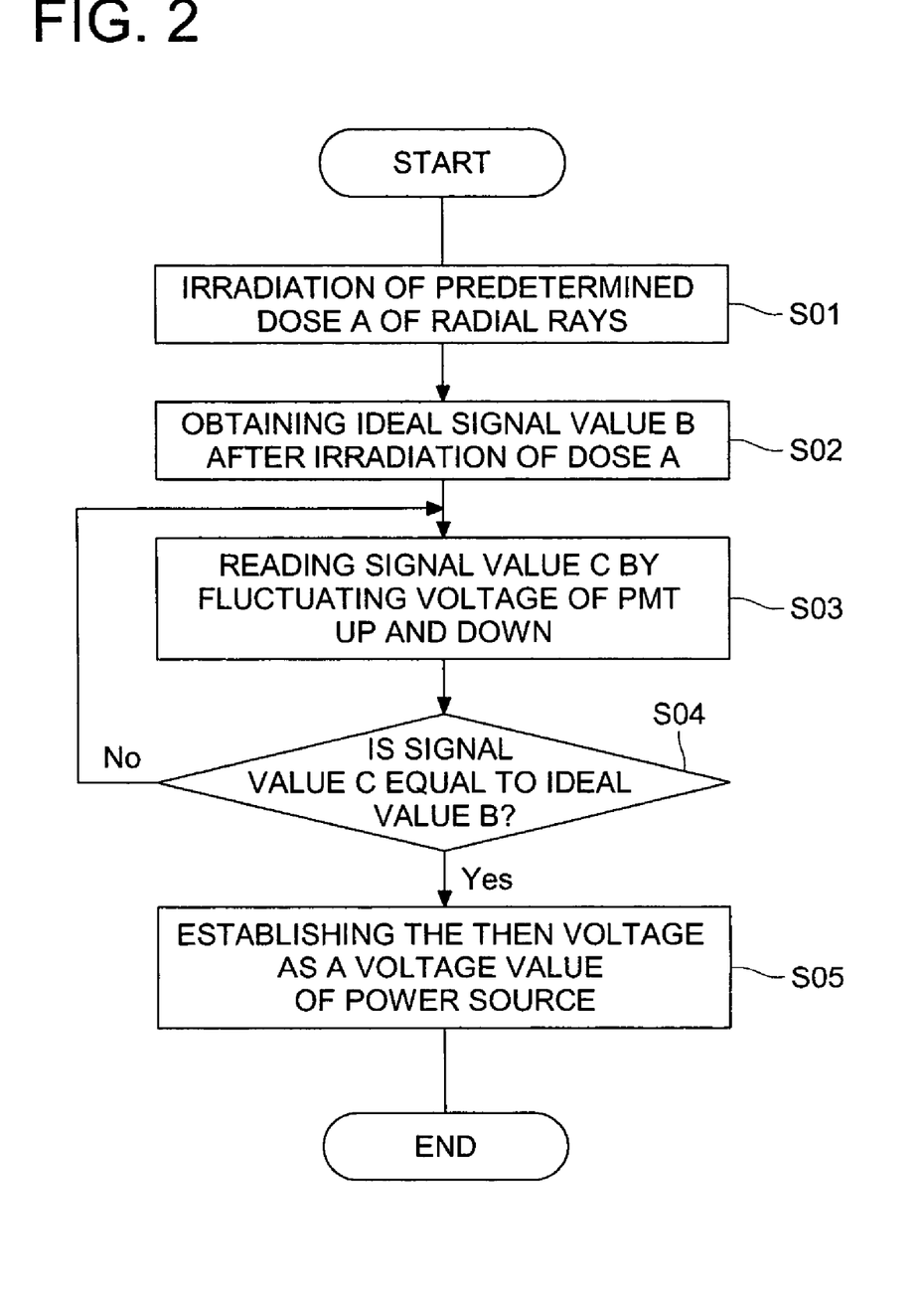
FIG. 2 is a flow chart showing a step to obtain a voltage setting value for a high-voltage power source for the sensitivity compensation of a photomultiplier in FIG. 1.

Next, sensitivity adjustment of photomultiplier 10 in the inputting apparatus 3 shown in FIG. 1 will be explained. FIG. 2 is a flow chart showing a step to obtain a voltage setting value in high-voltage power source 10*a* for the sensitivity compensation of photomultiplier 10.

For using a limited detecting capacity (dynamic range) owned by a detector of a flat panel detector or a photomultiplier in FDR system or CR system, signal values for a certain dose of radial rays are allocated. There are several patterns in the allocating method, and respective sensitivity-offset values are established in various patterns for a great many doses of radial rays, normal amount of doses of radial rays and a small number of doses of radial rays, and sensitivity-offset values are obtained through the following step in the present embodiment.

Namely, in the radiation image inputting apparatus of a CR type shown in FIG. 1, radial rays are projected at a predetermined dose (for example, AmR) for stimulable phosphor plate 4 in a prescribed size (S01). Then, an ideal value of the signal value in the case of projecting radial rays at a dose of AmR is obtained to be "B" (S02). This ideal value can be obtained from a prescribed algorithm as stated later.

Next, when light emitted on a stimulable basis from the stimulable phosphor plate 4 is detected by photomultiplier 10, voltage to be applied on the photomultiplier 10 from high-voltage power source 10*a* is fluctuated up and down as a sensitivity-offset value, and signal value C outputted from compensating portion 13 at each voltage value is read (S03).

Then, voltage of the high-voltage power source 10*a* is changed to adjust a voltage value so that the signal value C may become ideal signal value B (S04), and the voltage under which the signal value C becomes ideal signal value B is set on the high-voltage power source 10*a* as a compensation voltage value (S05).

In the way stated above, it is possible to conduct sensitivity adjustment of the photomultiplier 10 by obtaining appropriate voltage to be applied on the photomultiplier 10 automatically and by setting this voltage value on the high-voltage power source 10*a*. The sensitivity adjustment of the photomultiplier 10 of this kind can be conducted, for example, in the case of shipment so that sensitivity may be the same for all apparatuses of the same model for the radiation image inputting apparatus shown in FIG. 1, and it can also be conducted for maintenance when the photomultiplier is deteriorated. Further, each step mentioned above can be controlled by control section 17 shown in FIG. 1 for execution.

In the case of the sensitivity compensation as stated above for the radiation image inputting apparatus shown in FIG. 1, a single operation of projecting radial rays is enough for the sensitivity compensation, and it can be conducted by a value of dose of radial rays and by a signal value after radiographing, without requiring input of information of characteristic graph of a detector such as PMT, thus, the sensitivity compensation can be conducted simply. In addition, a precision of sensitivity compensation can be improved, because an unnecessary calculation is not needed.

Figure 3:
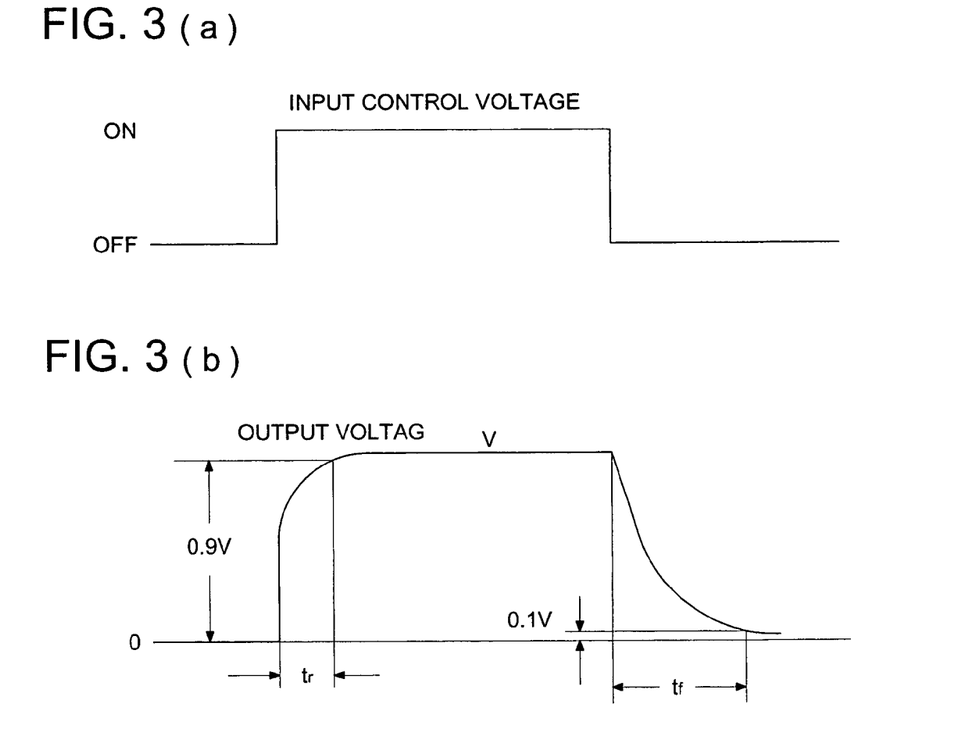

Next, referring to FIG. 3(*a*) and FIG. 3(*b*), there will be explained an appropriate fluctuating method for voltage in step S03 in FIG. 2 wherein responsiveness in voltage fluctuation of the aforementioned high-voltage power source 10*a* is taken into consideration. FIG. 3(*a*) and FIG. 3(*b*) are diagrams of input and output waveforms of the high-voltage power source 10*a* shown in FIG. 1, and specifically, FIG. 3(*a*) shows an example of input voltage waveform of a control signal to be applied on the high-voltage power source while FIG. 3(*b*) shows an example of output voltage waveform from the high-voltage power source 10*a*.

In the high-voltage power source 10*a* shown in FIG. 1, when input voltage of control signal as shown in FIG. 3(*a*) is inputted to make the power source to be on, output voltage rises as shown in FIG. 3(*b*), and rise time tr for the output voltage to arrive at the point of 90% of target output voltage V is in a trend to be shorter than fall time tf for the output voltage to fall to the point of 10% of the target output voltage V from the moment when the input voltage is turned off to be zero and the output voltage starts falling.

When the responsiveness of the high-voltage power source 10*a* shown in FIG. 3(*a*) and FIG. 3(*b*) is taken into consideration, it is possible to conduct sensitivity adjustment more rapidly, by obtaining a compensation voltage value in the direction to increase voltage of the high-voltage power source 10*a* in step S03 shown in FIG. 2.

On the other hand, when lowering voltage of the high-voltage power source 10*a* in step S03 in FIG. 2, having a longer stabilizing time rather than increasing voltage is preferable. By making a stabilizing time from the moment when a control signal is turned off to be longer in the case of falling voltage, the sensitivity compensation can be conducted at the stabilized voltage.

As stated above, it is preferable that a direction of voltage change in obtaining a compensation voltage value is determined by taking responsiveness in voltage fluctuation of the high-voltage power source into consideration, and a stabilizing time in voltage change is determined.

Figure 4:
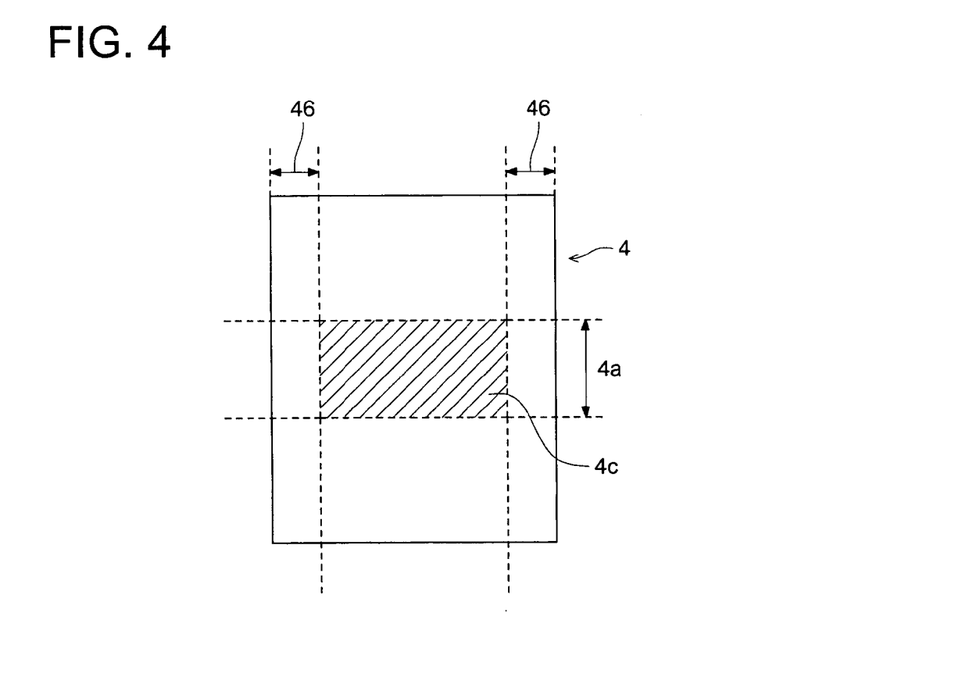
FIG. 4 is a plan view showing an area on a stimulable phosphor plate shown in FIG. 1 that is irradiated by radial rays in the case of sensitivity compensation.
Figure 5:
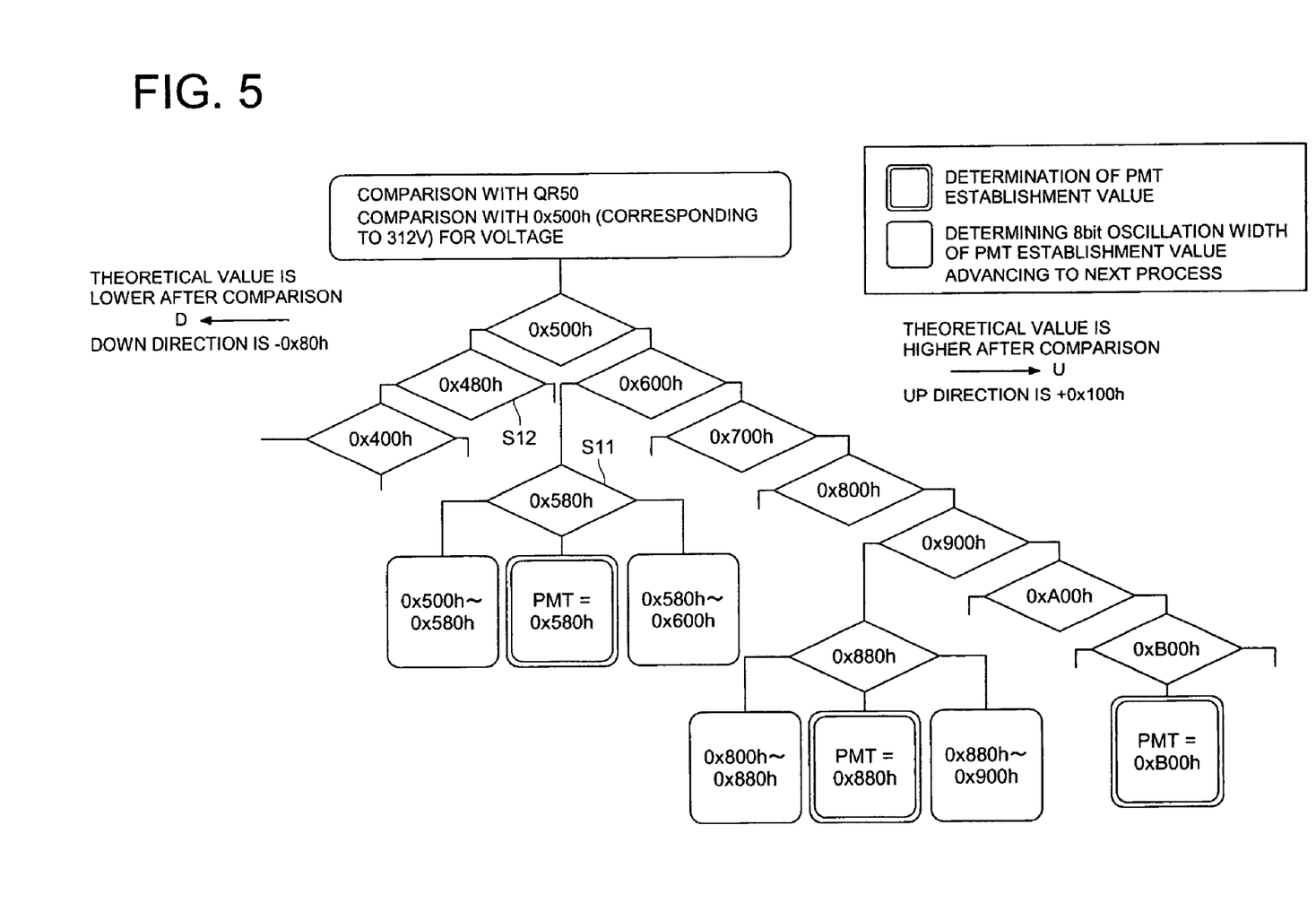
FIG. 5 is a flow chart showing steps to obtain a compensation voltage value by fluctuating voltage values shown in FIG. 2.
Figure 6:
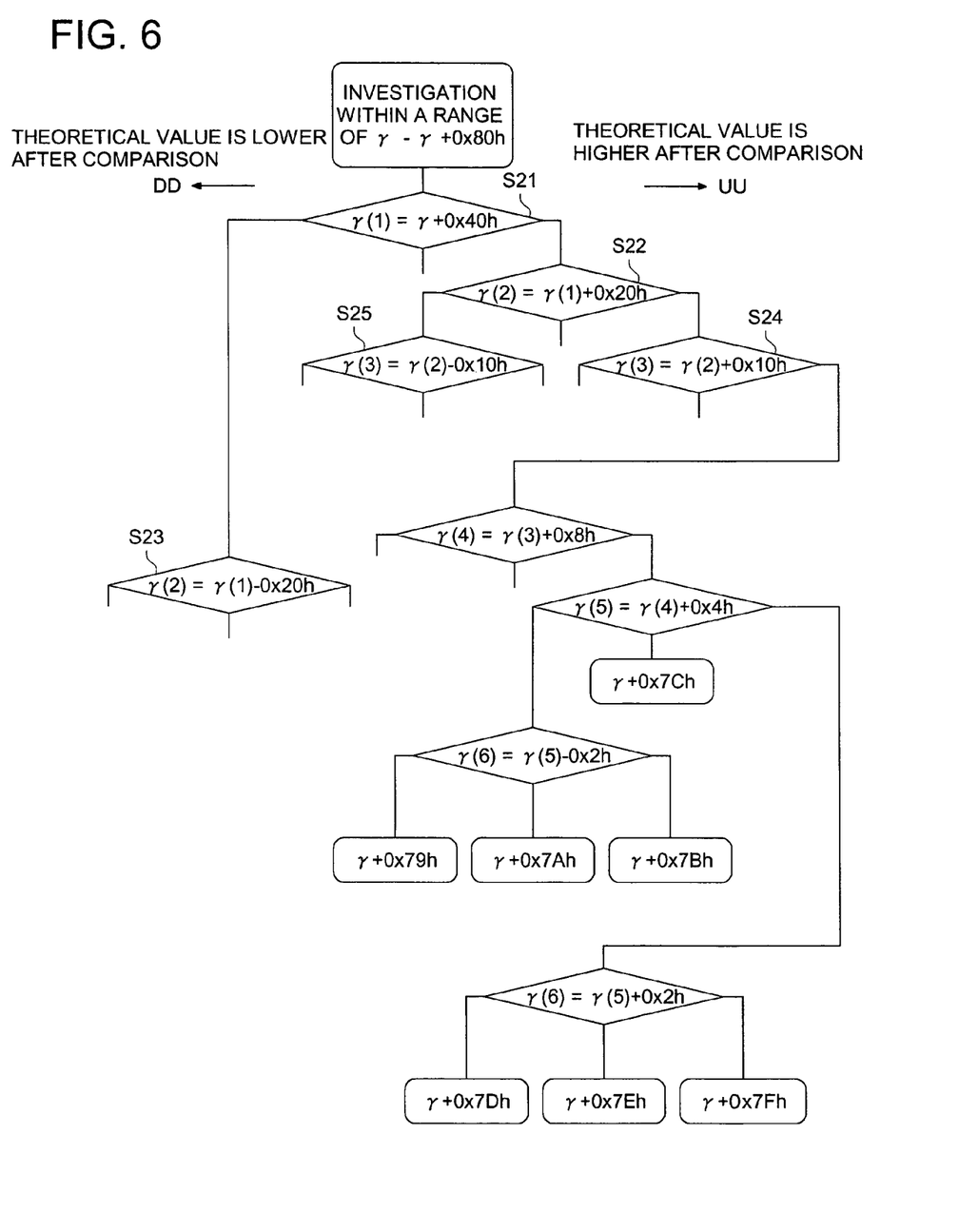
FIG. 6 is a flow chart showing steps to obtain a compensation voltage value finally that follows the steps shown in FIG. 5.

Next, referring to FIGS. 4, 5 and 6, there will be explained a specific example for obtaining an appropriate compensation voltage value to be established in photomultiplier 10 by changing a voltage value of the high-voltage power source 10*a* in step S03 in FIG. 2. FIG. 4 is a plan view showing an area on a stimulable phosphor plate 4 in FIG. 1 that is irradiated by radial rays in the case of sensitivity compensation, FIG. 5 is a flow chart showing a step to obtain a compensation voltage value by fluctuating voltage values and FIG. 6 is a flow chart showing a step to obtain a compensation voltage value finally that follows the step in FIG. 5.

When projecting radial rays on stimulable phosphor plate 4 shown in FIG. 1 for the purpose of sensitivity compensation, there is used irradiation area 4*c* shown with hatching in FIG. 4 that is on central area 4*a* in the vertical direction on the stimulable phosphor plate 4 and is obtained by cutting several pixels off the both ends in the horizontal direction with a certain width 4*b*. In this case, measurement of a dose of radial rays is conducted with the actual radiographing distance used for the sensitivity compensation.

Then, after irradiation of radial rays for the sensitivity compensation, a laser beam emitted from laser light source 6 in FIG. 1 scans irradiation area 4c in the way of main scanning in the horizontal direction in FIG. 4 and sub-scanning in the vertical direction. Then, stimulated emission light generated through the aforementioned scanning is detected by photomultiplier 10, and signal values (values from the actual measurement step) are read by compensating portion 13 shown in FIG. 1.

When conducting the sensitivity compensation, a voltage value for the high-voltage power source 10a is changed for each of QR=50, QR=250 and QR=500 under the assumption that QR represents a sensitivity setting value that is in proportion to voltage applied on photomultiplier 10. In this case, a predetermined dose of radial rays such as 10.00 mR, for example, is inputted. With regard to a range of dose for radial rays, it is freely selected to be in a range where the signal is not saturated upward and downward (range from the bottom of about 8 mR to the top of about 20 mR with no saturation, for example, in consideration of stability of radial rays), considering errors of the system, in the case, for example, of CR system.

Ideal signal value in step S02 in FIG. 2 is obtained by the following way. Namely, the ideal signal value (Step) is obtained through the following expression, for example, from the QR value desired and a value of incident dose X (mR);

Step=444.72×1$n$(X)+1024×log(QR)−821.26

Wherein, a precision for 1n (X) is three decimal places and log (QR) is four decimal places. Step value represents 12-bit data. This expression can be stored in control section 17 in FIG. 1, for example, and QR value and a value of incident dose X can be inputted from key board 26 of controller 18 in FIG. 1.

For the ideal Step value mentioned above, calculation is made in accordance with algorithm of the following voltage setting method for the high-voltage power source, to measure the actual Step value.

Voltage setting in the high-voltage power source 10a is conducted specifically as follows. For example, when the range of control voltage of high-voltage output is 0–6V and established value of high voltage control is made to be 12 bit (high voltage control voltage of 0–6V is set with a 12-bit established value, and control voltage of 0–6V is assumed to be in proportion with output voltage of 0–1000V), and when a power source wherein rising characteristic is excellent as shown in FIG. 3(a) and FIG. 3(b) (for example, 100 ms) and falling output is lowered relatively slowly (for example, 400 ms) is used, the following structure is tentatively used for the control.

Namely, in input voltage (maximum oscillation width 6V), the maximum lowering width in a single occasion is made to be within 0.2V (135 or less with a 12-bit established value. Within 8 bits), and the maximum raising width of input voltage is also made to be within 0.2V (within 8 bits) equally. In the case of voltage starting after changing the voltage setting value for the high-voltage power source 10a, reading of signal values is started after allowing a stabling time of 100 ms (equivalent to 20 lines under the assumption that the scanning time for one line is 5 ms, for example) to pass. In the case of voltage ending, a stabling time of 400 ms (80 lines) is allowed to pass. When changing voltage within a narrow range of 7 bits or less, there is no difference between rising characteristic and falling characteristic, and it is possible to cope by allowing a stabling time of 100 ms (20 lines) to pass.

Established voltage of high-voltage power source 10a is changed as follows for the ideal Step value obtained from the expression above, to bring actually measured Step value close to the ideal Step value.

(1) Established voltage is changed, beginning with low sensitivity (=low voltage of high-voltage power source), namely, with QR=50, in this case, to advance to QR=250 and QR=500. The actually measured Step value is obtained by an average signal value of several lines, for example, by an average value of 6 lines, when using a laser scanning system employing, for example, a 5-face polygon mirror. After that a voltage established value of the high-voltage power source is changed.

(2) For example, an initial value of a voltage established value (12-bit setting) of a power source of outputting 0–1000V is made to be 0×500 h (which is based on the hexadecimal number system, and so forth, and this corresponds to about 312V as output voltage of a high-voltage power source, for example), and if the ideal Step value is greater than the actually measured Step value in this case, +0×100 h is added to the initial value of the voltage established value, and if the ideal Step value is smaller than the actually measured Step value, −0×80 h is added to the initial value of the voltage established value. When the ideal Step value is greater than the actually measured Step value at a certain voltage established value as stated above, a process advances in the UP direction U toward the right in the diagram as shown in FIG. 5, and +0×100 h is added to the voltage established value. If the ideal Step value is smaller than the actually measured Step value, a process advances in the DOWN direction D toward the left in FIG. 5, and −0×80 h is added to the voltage established value. Further, if the ideal Step value is equal to the actually measured Step value, the then voltage established value is a voltage compensation value for QR=50.

(3) When the ideal Step value is greater than the actually measured Step value in the case of initial value 0×100 h, the process advances in the UP direction U in FIG. 5, and when 0×600 h obtained by adding +0×100 h to the initial value is compared with the ideal Step value, if the ideal Step value is greater, +0×100 h is further added. When the ideal Step value is smaller than the actually measured Step value, the process advances in the DOWN direction D in FIG. 5 to advance to the following (4) after −0×80 h is added.

(4) When the actually measured Step value and the ideal Step value are compared with each other in the case of value α (α is, for example, 0×580 h as in S11 in FIG. 5), and if the ideal Step value is greater, the voltage established value is examined within a range of "α−α+0×80 h", and the process advances to (7). If the ideal Step value is smaller, a voltage established value is examined under the value of "α−0×80 h−α" and the process advances to (7). When both of them are the same each other, α represents voltage compensation value.

(5) When the ideal Step value is smaller than the actually measured Step value in the case of initial value 0×500 h, 0×480 h (−0×80 h subtraction) is compared with the ideal Step value, and if the ideal Step value is smaller, −0×80 h is added, and if the ideal Step value is greater, the process advances to the following (6).

(6) From the existing voltage established value β (β is 0×480 h, for example, as in S12 in FIG. 5), the voltage established value is examined within a range of "β−β+0×80 h", and the process advances to the following (7).

(7) After the range of examination (7 bit width) is determined in (4) or (6) stated above, the voltage established value is settled in the way shown in FIG. 6. Incidentally, a stabilizing time of the high-voltage power source in this case is fixed to 100 ms (20 lines in this case).

(8) When the range of examination for the voltage established value turns out to be "γ–γ+0×80 h" as shown in FIG. 6, the actually measured Step value in the case of "γ(1)=γ+0×40 h" is compared with the ideal Step value (S21), and if both of them are the same each other, the then γ(1) is determined to be the voltage established value. If the ideal Step value is greater than the actually measured Step value, the process advances in the direction UU toward the right side in FIG. 6, then, +0×20 h is added to γ(1) and the process advances to the following (9). If the ideal Step value is smaller than the actually measured Step value, the process advances in the direction DD toward the left side in FIG. 6, and –0×20 h is added to γ(1) (the same comparison is made in step S23 in FIG. 6).

(9) As in step S22 in FIG. 6, the comparison identical to that in (8) is made under the condition of "γ(2)=γ(1)+0×20 h" which is obtained by adding +0×20 h to γ(1), and when both of them are the same each other, γ(2) is determined to be the voltage established value, while, when both of them are different each other, addition or subtraction is conducted equally with a value of 0×10 h, and the process advances to S24 and S25 in FIG. 6. After that, comparisons are made equally to change the voltage established value by conducting addition and subtraction with attenuating values of 0×8 h, 0×4 h, 0×2 h and 0×1 h.

(10) When the operations about QR=50 are completed in the aforementioned way, operations identical to the foregoing are conducted about QR=250. In this case, the operations are started from the point to which the operations for QR=50 have been advanced, for example, when an examination has been made to 0×700 h under QR=50, operations for QR=250 are started from 0×700 h. Then, operations for QR=500 are also conducted equally. The reason for conducting operations in this order is that starting from low sensitivity is suitable because voltage rises as sensitivity is changed from the low level to the high level, and control in power source reference is possible in the direction to raise voltage. Further, when the order of low sensitivity, standard sensitivity and high sensitivity is kept, voltage for the standard sensitivity is always higher than that for the low sensitivity. Therefore, it is not necessary to retrieve under the voltage that is lower than that has been determined at the lower sensitivity.

Though it is possible to obtain the voltage established value for high-voltage power source 10a in FIG. 1, each step in FIGS. 5 and 6 can be executed by control section 17 in FIG. 1, and the voltage established value as a sensitivity compensation value can be obtained automatically. Incidentally, in the routine to compare the actually measured Step value with the ideal Step value, even when signal values are deviated finally, both of them are judged to be the same each other if they are within a prescribed range (for example, within ±20 step), the value in that case is made to be the voltage established value.

Next, referring to FIGS. 7 and 8, there will be explained two examples as another method for obtaining the voltage established value in high-voltage power source 10a for sensitivity compensation of photomultiplier 10.

Figure 7:
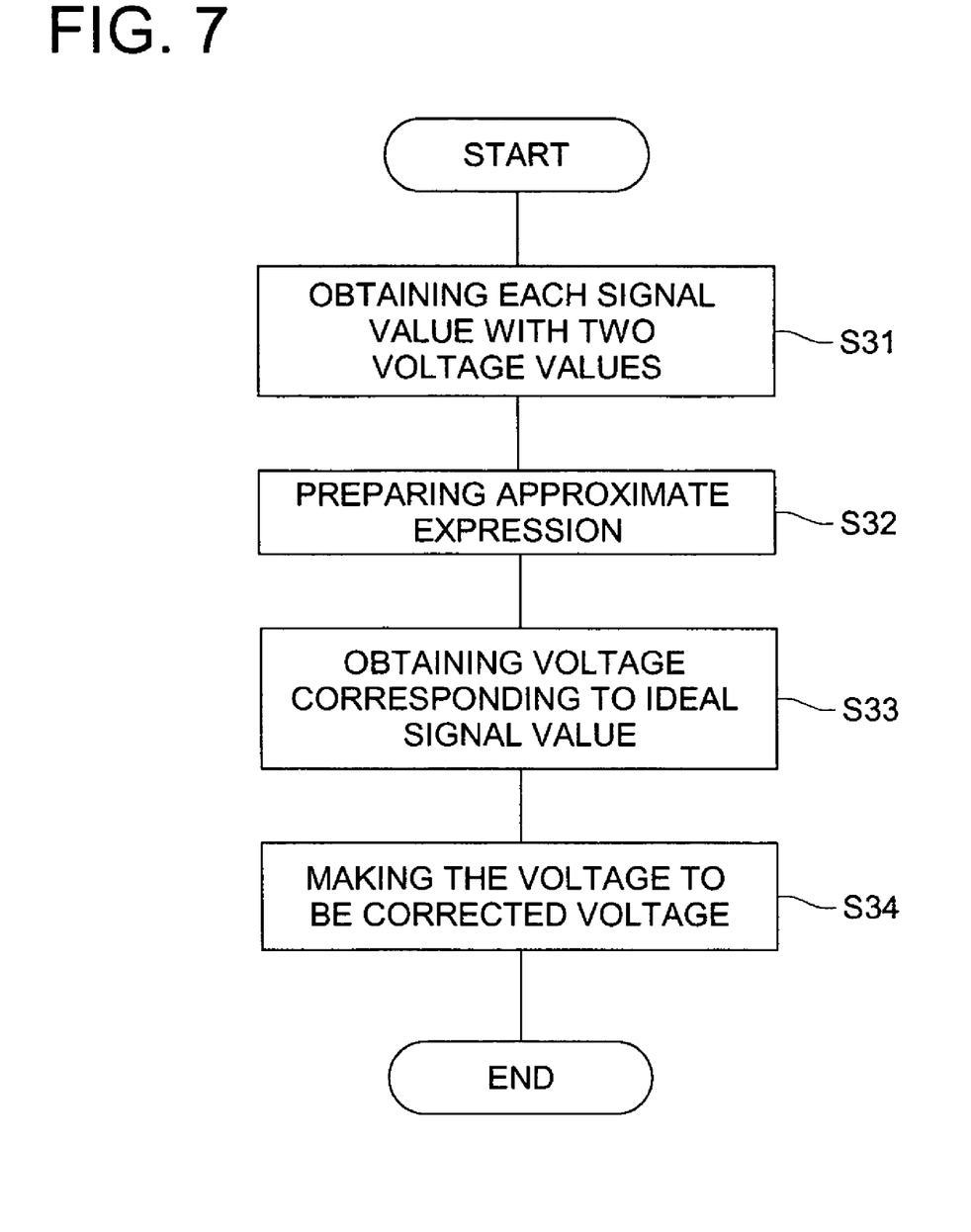
FIG. 7 is a flow chart showing another method for obtaining a voltage setting value for a high-voltage power source for the sensitivity compensation of a photomultiplier shown in FIG. 1.

In the example shown in FIG. 7, an approximate expression is prepared from two sensitivity-offset values, and the sensitivity-offset value is obtained from the ideal value to become the sensitivity compensation value. Namely, when photomultiplier 10 in FIG. 1 is used, voltage values of 300V and 700V, for example, are set by the photomultiplier 10, and a signal value at each voltage value is obtained (S31). In this case, a voltage establishment value is changed from 300V to 700V on, for example, a half image in the vertical direction on area 4c in FIG. 4.

Next, an approximate expression of voltage and signal value is prepared from respective average signal values of 300V and 700V (S32), then, an ideal signal value is inputted in the approximate expression, and a voltage value in that case is obtained (S33) to become a voltage establishment value compensated as a sensitivity-offset value (S34). In the aforementioned way, a compensated voltage value can be obtained simply. Incidentally, the approximate expression can be prepared for three items, four items or more, without being limited to two items.

Figure 8:
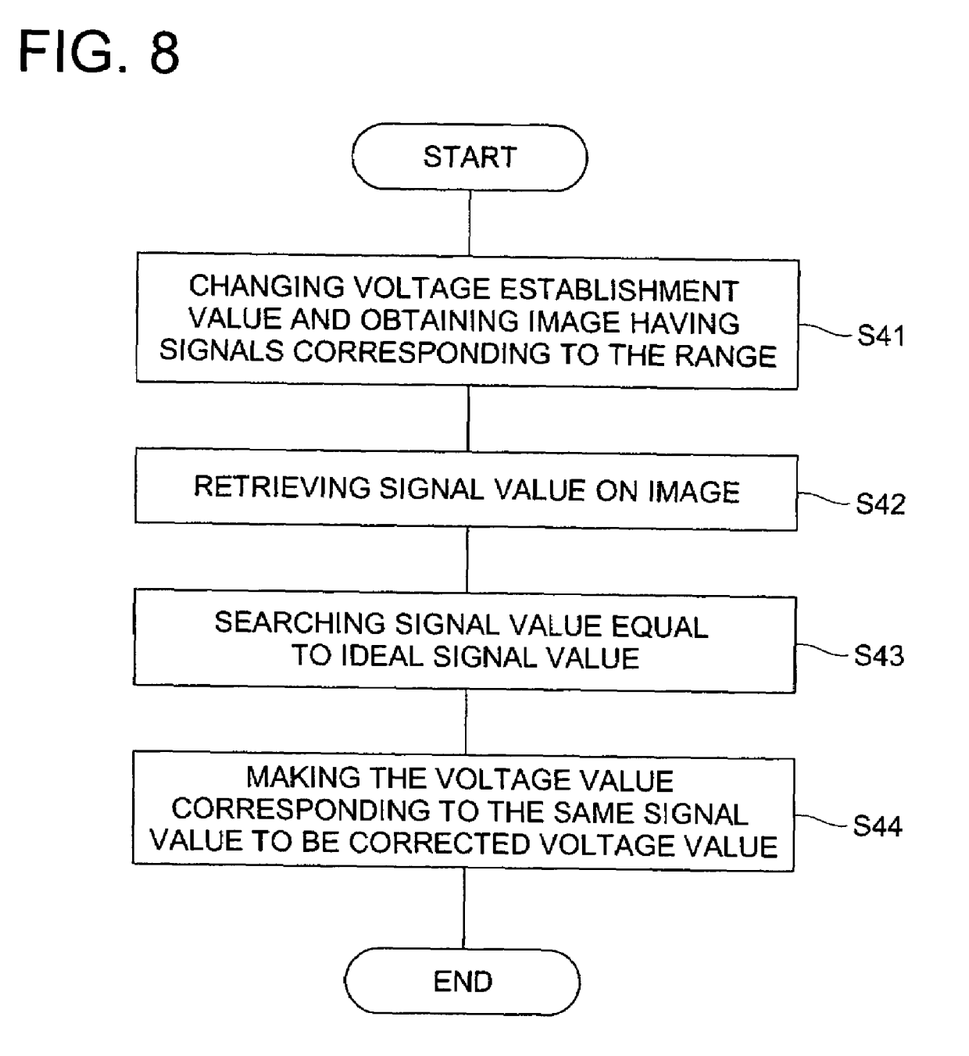
FIG. 8 is a flow chart showing still another method for obtaining a voltage setting value for a high-voltage power source for the sensitivity compensation of a photomultiplier shown in FIG. 1.

Next, in the example shown in FIG. 8, a sensitivity-offset value is changed within a prescribed range (gradation) to retrieve a signal value corresponding to the ideal signal value, and the sensitivity-offset value corresponding to the signal value is made to be the sensitivity compensation value. Namely, when an ideal signal value in the case of giving a dose of αmR is assumed to be βstep, for example, the sensitivity-offset value that outputs ideal signal value β is made to be the sensitivity compensation value.

First, when photomultiplier 10 in FIG. 1 is used, voltage establishment values of the photomultiplier 10, for example, are changed from the upper limit to the lower limit in a time series. To be concrete, a voltage value is increased by an increment of 1V on a unit of 100 pixels, for example, and an image (one image) having a signal corresponding to a range of 0V–1000V is obtained (S41). Then, a signal value on the image is retrieved (S42), and a signal value identical to ideal signal value β is found out (S43). Then, a voltage value corresponding to the same signal value is obtained to become compensation voltage value (S44).

Next, there will be explained sensitivity compensation in the occasion where stimulable phosphor plate 4 has a sensitivity difference in the aforementioned radiation image inputting apparatus 50. For example, when a stimulable phosphor plate solely for mammography has sensitivity that is, for example, twice that of a regular stimulable phosphor plate, if a range of voltage fluctuation of high-voltage power source 10a is not large, there occurs a possibility that voltage setting is impossible. Therefore, for example, it is possible to conduct sensitivity compensation without making the range of voltage fluctuation of the high-voltage power source to be large, and to obtain the compensation voltage value, by conducting sensitivity compensation after setting an ideal signal value small with a prescribed half magnification in step S02 of sensitivity compensation like that in FIG. 2. A prescribed magnification for the ideal signal value can be controlled by control section 17 shown in FIG. 1. Incidentally, in the sensitivity compensation in the occasion where the stimulable phosphor plate has a sensitivity difference, same effects can be obtained by changing the dose for the stimulable phosphor plate with a prescribed magnification.

Next, in the aforementioned sensitivity compensation operation, while laser light source section 6 in FIG. 1 is moving together with photomultiplier 10 in the sub-scanning direction perpendicular to the laser scanning direction at a prescribed pitch, the photomultiplier 10 detects light emitted from stimulable phosphor plate 4, and in this case, if the sampling pitch differs between lines, there is caused a difference in an amount of emitted light (difference in luminance signal value). For example, when detecting with sampling pitches of 100 μm and 200 μm respectively, reading with sampling pitch of 100 μm is conducted finely, and by overlapping partially with adjoining two for reading so that scanning unevenness may not be caused. Therefore, image data portion before reading (on next line) is also laser-scanned, thus, a part of information (excited electron) on the stimulable phosphor plate is lost, and there is caused a phenomenon that information is slightly reduced when reading the next line. The width of overlapping with lines is determined by a spot width of a laser beam and it does not depend on a sampling pitch, and when comparing an influence of the overlapping portion in the course of rough reading at 200 μm with that in the course of fine reading at 100 μm, there is a phenomenon that fine reading is affected adversely and sensitivity is lowered. In this case, when a luminance ratio is 0.9 for example, the following expression holds.

$$\text{Voltage value for 200 μm detection} = (\text{Voltage value for 100 μm detection}) \times 0.9 \quad (1)$$

Therefore, when there is a difference in sampling pitches, and thereby, sensitivity is lowered in fine reading, the difference of an amount of emitted light can be corrected automatically based on the expression (1).

Further, when a laser spot is small in size and it does not overlap with adjoining two lines accordingly, a laser irradiation time per unit area is long, and thereby, an amount of emitted light is increased and sensitivity is raised. In this case, a laser irradiation time per unit area is long, and an amount of emitted light is increased, and thereby, sensitivity is raised compared with an occasion of 200 μm. Since an amount of this rise of sensitivity is constant, when a luminance ratio is 0.9 for example, the following expression holds.

$$\text{Voltage value for 100 μm detection} = (\text{Voltage value for 200 μm detection}) \times 0.9 \quad (2)$$

Therefore, when there is a difference in sampling pitches, and thereby, sensitivity is raised in fine reading, the difference of an amount of emitted light can be corrected automatically based on the expression (2).

Even when there is a difference in sampling pitches as stated above, it is possible to finish calibration of both sampling pitches by conducting sensitivity compensation once with a sampling pitch on one side. Incidentally, three or more sampling pitches can naturally be used without being limited to two sampling pitches. Further, the correction of a difference of an amount of emitted light stated above can be controlled by control section 17 shown in FIG. 1.

The invention has been explained above, referring to the embodiment to which, however, the invention is not limited, and various changes and modifications may be made in the invention without departing from the technical spirit and scope thereof. For example, a radiation image inputting apparatus to which the invention can be applied may also be a FPD type without being limited to the CR type.

Namely, FPD (a flat panel detector) is classified into an indirect system and a direct system in general, and in the indirect system, entering X-rays are converted by a phosphor into visible rays, then, the visible rays are received by a photosensor such as a diode for a-Si:H light for each pixel to generate electric charges which are read by an active matrix array. In the direct system, on the other hand, entering X-rays are projected on a photoconductor to generate electric charges which are accumulated on a unit of a pixel to be read by an active matrix array. These active matrix arrays are calibrated by a switching element of a diode or of TFT.

After projected radiation energy is converted into an electric signal, the signal is amplified further by a preamplifier in FPD, in both the indirect system and the direct system, and an amplified analog signal is converted into a digital signal. Thus, the so-called "sensitivity compensation" can be conducted, by standardizing dispersion errors for sensitivity in each element by changing the amplification factor of the preamplifier.

Even in the case of FPD, analog signals are adjusted to the relevant range (for example, a range of luminance signal of four figures in a certain range if radial rays (0.01 mR–100 mR) by adjusting the amplification factor of the preamplifier for both the indirect system and the direct system, in the same way as in CR. It is therefore possible to conduct sensitivity compensation automatically with the same algorithm, by replacing voltage value adjustment of PMT stated above to the adjustment function for the amplification factor of the preamplifier.

The invention makes it possible to provide an image inputting apparatus for detecting and inputting radiation image information wherein sensitivity compensation can be conducted simply and accurately and to provide an image inputting method.

Disclosed embodiment can be varied by a skilled person without departing from the spirit and scope of the invention.

What is claimed is:

1. An apparatus for reading a radiation image formed on a radiation sensitive panel exposed with radial rays penetrated through a subject, the apparatus comprising:
   a detector to obtain an image signal of the radiation image formed on the radiation sensitive panel by converting the radiation image from the radiation sensitive panel into an electric signal; and
   a sensitivity compensating section to automatically compensate a sensitivity of the detector based on a radiation sensitive panel exposed with a predetermined dose of radial rays such that (1) the detector obtains a signal by scanning an irradiation area of the radiation sensitive panel with a sensitivity value and the sensitivity compensating section compares the value of the signal with the ideal value of said signal corresponding to the predetermined dose of radial rays and (2) when the value of the signal is not equal to the ideal value, the sensitivity compensating section controls so that the detector obtains another signal by scanning the irradiation area of the radiation sensitive panel with another different sensitivity value different from said sensitivity value by a sensitivity value predetermined depending on a result of a comparison between the value of the signal and the ideal value and the sensitivity compensating section compares the value of another signal with the ideal value, and the sensitivity compensating section repeats the operations (1) and (2) until the value of a signal becomes equal to the ideal value to obtain a signal having a value equal to the ideal value, and determines the sensitivity value applied to obtain the signal having the value equal to the ideal value as a sensitivity compensation value to compensate a sensitivity of the detector.

2. The apparatus of claim 1,
   wherein said detector varies said drive voltage in a direction of increasing said drive voltage.

3. The apparatus of claim 1,
wherein a stabilizing time necessary to stabilize said drive voltage toward a target voltage, for decreasing said drive voltage is greater than that for increasing said drive voltage.

4. The apparatus of claim 1, further comprising:
a storage section to store said predetermined ideal value of said signal value;
wherein said radiation sensitive panel is an electro-radiation sensitive device which converts radial rays into electricity, and said detector includes an amplifier to determine the sensitivity value; and
wherein said sensitivity compensating section finds an optimum sensitivity-offset value, which makes said signal value of said radiation image equal to said predetermined ideal value stored in said storage section, by varying an amplifying ratio of said amplifier.

5. The apparatus of claim 4,
wherein said apparatus employs a Flat Panel Detector including said electro-radiation sensitive device and said detector.

6. The apparatus of claim 1, further comprising:
a storage section to store said predetermined ideal value of said signal value;
wherein said sensitivity compensating section retrieves an optimum sensitivity-offset value, which makes said signal value of said radiation image equal to said predetermined ideal value stored in said storage section, from a plurality of sensitivity-offset values obtained by varying said sensitivity of said detector, in order to establish said optimum sensitivity offset value as said sensitivity compensation value.

7. The apparatus of claim 1,
wherein said detector includes a photomultiplier for detecting phosphor light emitted from said radiation sensitive panel and a power source to supply an electronic power to said photomultiplier by applying a drive voltage onto said photomultiplier, and said sensitivity of said detector varies with change of said drive voltage, and said optimum sensitivity-offset value corresponds to an optimum drive voltage; and
wherein at least one of said predetermined dose of said radial rays and said predetermined ideal value is changed with a predetermined magnification, and then, said sensitivity compensating section finds said optimum drive voltage by varying said drive voltage, in order to establish said optimum drive voltage as a sensitivity compensation voltage.

8. The apparatus of claim 1,
wherein said detector includes a photomultiplier, for detecting phosphor light emitted from said radiation sensitive panel when irradiating a light scanned at a predetermined sampling pitch in a sub-scanning direction onto said radiation sensitive panel recorded with said image, and a power source to supply an electronic power to said photomultipiler by applying a drive voltage onto said photomultiplier, and said sensitivity of said detector varies with change of said drive voltage, and said optimum sensitivity-offset value corresponds to an optimum drive voltage; and
wherein said sensitivity compensating section finds said optimum drive voltage as a sensitivity compensation voltage by correcting differences between luminance signal values due to a difference of said predetermined sampling pitch.

9. The apparatus of claim 1, further comprising:
a power source to supply a drive voltage to the detector;
wherein the power source supplies a standard drive voltage and the sensitivity compensating section controls the power source to vary the plural different drive voltages different by an offset voltage from the standard drive voltage and determines the offset voltage so as to change and determine the sensitivity value.

10. A method of reading a radiation image formed on a radiation sensitive panel exposed with radial rays penetrated through a subject, the method comprising:
obtaining an image signal of the radiation image formed on the radiation sensitive panel by converting to radiation image from the radiation sensitive panel into an electric signal; and
automatically compensating a sensitivity of the detector based on a radiation sensitive panel exposed with a predetermined dose of radial rays such that (1) the detector obtains a signal by scanning an irradiation area of the radiation sensitive panel with sensitivity value and the sensitivity compensating section compares the value of the signal with the ideal value of said signal corresponding to the predetermined dose of radial rays and (2) when the value of the signal is not equal to the ideal value, the sensitivity compensating section controls so that the detector obtains another signal by scanning the irradiation area of the radiation sensitive panel with another different sensitivity value different from said sensitivity value by a sensitivity value predetermined depending on a result of a comparison between the value of the signal and the ideal value and the sensitivity compensating section compares the value of the another signal with the ideal value, and the sensitivity compensating section repeats the operations (1) and (2) until the value of a signal becomes equal to the ideal value to obtain a signal having a value equal to the ideal value, and determines the sensitivity value applied to obtain the signal having the value equal to the ideal value as a sensitivity compensation value to compensate a sensitivity of the detector.

11. The method of claim 10,
wherein a direction of varying said drive voltage is determined on the basis of an input-output response property of said power source.

12. The method of claim 10,
wherein a stabilizing time necessary to stabilize said drive voltage toward a target voltage, of said drive voltage is determined on the basis of an input-output response property of said power source.

13. The method of claim 10, further comprising:
establishing said predetermined ideal value in advance;
wherein said radiation sensitive panel is an electro-radiation sensitive device which converts radial rays into electricity, and an amplifier to determine the sensitivity value; and
wherein an optimum sensitivity-offset value, which makes said signal value of said radiation image equal to said predetermined ideal value established in said establishing step, is found by varying an amplifying ration of said amplifier.

14. The method of claim 13,
wherein a Flat Panel Detector, including said electro-radiation sensitive device and said amplifier, is employed in said detecting step.

15. The method of claim 10, further comprising:

establishing said predetermined ideal value in advance;

wherein an optimum sensitivity-offset value, which makes said signal value of said radiation image equal to said predetermined ideal value established in said establishing step, is retrieved from a plurality of sensitivity-offset values obtained by varying said sensitivity of detecting said radiation image, in order to establish said optimum sensitivity offset value as said sensitivity compensation value.

16. The method of claim 15, wherein a photomultiplier, having a photo-electronic converting function, and a power source, to supply an electronic power to said photomultiplier by applying a drive voltage onto said photomultiplier, are employed in said detecting step; and wherein said drive voltage is varied so as to vary said sensitivity of detecting said radiation image.

17. The method of claim 16, wherein, considering a response property of said power source when varying said drive voltage, said optimum sensitivity-offset value is retrieved from said plurality of sensitivity-offset values in order of low-to-high voltage values.

18. The method of claim 10, wherein at least one of said predetermined dose of said radial rays and said predetermined ideal value is changed with a predetermined magnification, and then, said optimum sensitivity-offset value is found as said sensitivity compensation value.

19. The method of claim 10, further comprising:

supplying a drive voltage to the detector;

wherein a power source supplies a standard drive voltage and the sensitivity compensating section controls the power source to vary the plural different drive voltages different by an offset voltage from the standard drive voltage and determines the offset voltage so as to change and determine the sensitivity value.

* * * * *